United States Patent
Lee et al.

(10) Patent No.: US 9,323,653 B2
(45) Date of Patent: Apr. 26, 2016

(54) APPARATUS AND METHOD FOR PROCESSING DATA

(75) Inventors: Hyun-Min Lee, Suwon-si (KR); Yoon-Soo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 12/969,164

(22) Filed: Dec. 15, 2010

(65) Prior Publication Data

US 2011/0191550 A1  Aug. 4, 2011

(30) Foreign Application Priority Data

Feb. 4, 2010  (KR) .................. 10-2010-0010569

(51) Int. Cl.
 *G06F 12/00* (2006.01)
 *G06F 13/16* (2006.01)
 *G06F 3/06* (2006.01)

(52) U.S. Cl.
 CPC .............. *G06F 12/00* (2013.01); *G06F 3/0653* (2013.01); *G06F 13/1663* (2013.01)

(58) Field of Classification Search
 CPC ........................................... G06F 3/0653
 USPC ...................................... 711/156
 See application file for complete search history.

(56) References Cited

U.S. PATENT DOCUMENTS

| | | | |
|---|---|---|---|
| 6,008,820 A * | 12/1999 | Chauvin et al. ............... 345/502 |
| 7,127,723 B2 | 10/2006 | Endo et al. |
| 7,130,471 B2 * | 10/2006 | Bossut et al. ................. 382/232 |
| 7,461,175 B2 * | 12/2008 | Ono et al. ..................... 719/310 |
| 7,515,293 B2 | 4/2009 | Kizaki et al. |
| 7,876,766 B1 * | 1/2011 | Atkins et al. ................. 370/401 |
| 8,200,473 B1 * | 6/2012 | Dropps et al. ................. 703/21 |
| 8,638,456 B2 | 1/2014 | Hayashi |
| 2003/0156649 A1 * | 8/2003 | Abrams, Jr. ............. 375/240.24 |
| 2003/0217237 A1 * | 11/2003 | Benveniste et al. ........... 711/153 |
| 2004/0002385 A1 * | 1/2004 | Nguyen .......................... 463/42 |
| 2006/0128407 A1 * | 6/2006 | Kim ............................. 455/466 |
| 2006/0164519 A1 * | 7/2006 | Kaku ......................... 348/222.1 |
| 2008/0140971 A1 * | 6/2008 | Dankel et al. ................. 711/163 |
| 2009/0031101 A1 * | 1/2009 | Soga et al. ..................... 711/200 |
| 2009/0070356 A1 * | 3/2009 | Mimatsu ....................... 707/101 |
| 2010/0138652 A1 * | 6/2010 | Sela ..................... G06F 21/445 713/158 |

FOREIGN PATENT DOCUMENTS

| | | |
|---|---|---|
| JP | 2001-243080 | 7/2001 |
| JP | 2004-148552 A | 5/2004 |
| JP | 2005-227922 | 8/2005 |
| JP | 2007-283693 A | 11/2007 |
| JP | 4340120 B2 | 7/2009 |
| KR | 10-2008-0019079 | 3/2008 |
| KR | 10-2008-0072335 | 8/2008 |

OTHER PUBLICATIONS

Korean Office Action issued Mar. 28, 2014 in counterpart Korean Patent Application No. 10-2010-0010569. (8 pages including English Translation).

* cited by examiner

*Primary Examiner* — Prasith Thammavong (74) *Attorney, Agent, or Firm* — NSIP Law (57) ABSTRACT

An apparatus and method for processing data capable of providing an application with data converted based on various data types is provided. The data processing apparatus converts data, which is input from an input system, into various types of data. Various applications receive and use the data that is converted in the data processing apparatus.

16 Claims, 5 Drawing Sheets

APPARATUS AND METHOD FOR PROCESSING DATA

CROSS-REFERENCE TO RELATED APPLICATION

This application claims the benefit under 35 U.S.C. §119 (a) of Korean Patent Application No. 10-2010-0010569, filed on Feb. 4, 2010, in the Korean Intellectual Property Office, the disclosure of which is incorporated by reference in its entirety for all purposes.

BACKGROUND

1. Field

The following description relates to an apparatus and method for processing data, in which input data is converted and the converted data is stored.

2. Description of the Related Art

In recent years, a large number of devices are being equipped with various functions. For example, various mobile phones are being developed in the form of a multimedia device having various functions such as still image photographing, moving picture photographing, playback of music files or moving picture files, reception of broadcasting programs, and internet access. To this end, such a device needs to be equipped with various applications corresponding to each of the various functions.

However, since a plurality of applications are used in a single device, conflicts between applications frequently occur. In addition, respective applications may use different types of data. Accordingly, the need for efficiently executing various applications arises.

SUMMARY

The following description relates to a method of providing an application with data which is converted based upon various data types, and an apparatus to perform the method.

The foregoing an/or other features and aspects may be achieved by providing an apparatus to process data, the apparatus including a memory unit to store data type information about data which is capable of being processed in an application, a conversion unit to convert input data based on the data type information, and a memory control unit to perform control operations such that the converted data is stored in the memory unit.

The data processing apparatus may further include a signal control unit to generate a storage completion signal in response to the storing of the converted data in the memory unit being completed, and send the storage completion signal to the application.

The data processing apparatus may further include a setting unit to set the data processing apparatus based on setting information about the data processing apparatus that is stored in the memory unit.

The setting information may represent information indicating whether the input data is to be converted, and the setting unit may determine whether to convert the input data based on the setting information.

The setting information may represent information indicating whether the memory unit is to be divided into a shared area and a non-shared area, and the setting unit may divide the memory unit into a shared area and a non-shared area based on the setting information.

The setting information may represent information indicating whether the memory unit is to be divided according to data type, and the setting unit may divide the memory unit into respective areas of data type based on the setting information.

The data type information may include at least one piece of information regarding limitation of data size and storage format of data.

The memory control unit may transmit data which is capable of being processed in the application among the data stored in the memory unit to the application in response to receiving a data transmission signal from the application.

The foregoing an/or other features and aspects may be achieved by providing a method of processing data, the method including converting input data based on data type information about data which is capable of being processed in an application, and storing the converted data in a memory unit.

The method may further include generating a storage completion signal in response to the storing of the data in the memory unit being completed, and sending the storage completion signal to the application.

The method may further include determining whether to convert the input data.

The storing of the converted data may include storing the converted data into a shared area or a non-shared area of the memory unit that are divided depending on whether the input data is to be shared.

The storing of the converted data may include storing the converted data in respective areas of the memory unit that are divided for each data type, depending on the data type.

The data type information may include at least one piece of information regarding limitation of data size and storage format of data.

Other features and aspects will become apparent to those skilled in the art from the following detailed description, which, taken in conjunction with the attached drawings, discloses various examples.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will suggest themselves to those of ordinary skill in the art. Also, descriptions of well-known functions and structures may be omitted to enhance clarity and conciseness.

Hereinafter, examples will be described with reference to accompanying drawings in more detail.

Figure 1:
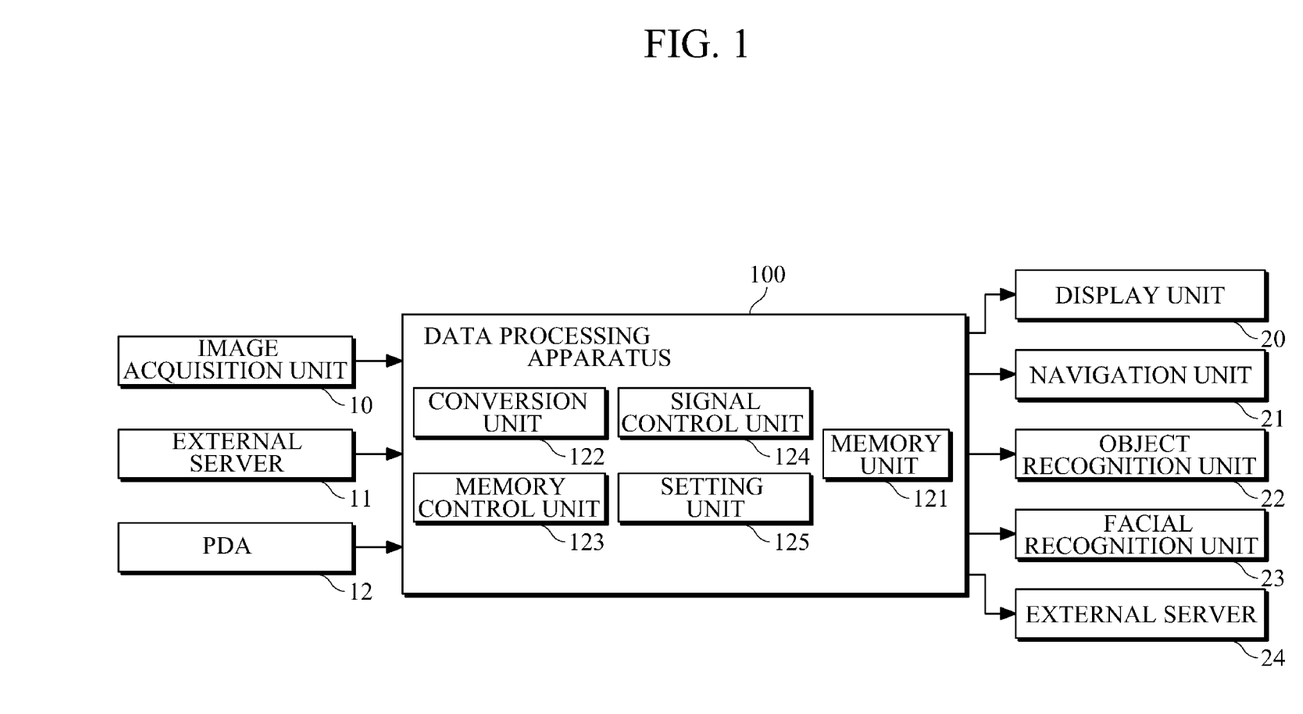
FIG. 1 is a block diagram illustrating an example of a configuration of a data processing apparatus.

FIG. 1 is a block diagram illustrating an example of a configuration of a data processing apparatus.

As illustrated in FIG. 1, a data processing apparatus 100 may convert data that is input from a data input system such as, for example, an image acquisition unit 10, an external server 11, and a personal digital assistant (PDA) 12. The data processing apparatus 100 may transmit the converted data into various components such as, for example, a display unit 20, a navigation unit 21, an object recognition unit 22, a facial recognition unit 23, and an external server 24. It is understood that these are merely examples of the many types of devices with which the data processing apparatus 100 may receive and/or transmit data from/to. Respective components may operate based on various applications, and data formats capable of being processed in the respective applications may be various. The application may be a software program, an algorithm, and so on.

The image acquisition unit 10 may process an image frame such as a still image or a moving image that may be acquired through an image sensor. The processed image frame may be transmitted to the data process apparatus 100. The image acquisition unit 10 may be provided with an image sensor such as a Charge Coupled Device (CCD), a Complementary Metal Oxide Semiconductor (CMOS), a Contact Image Sensor (CIS), etc.

The external server 11 may be connected to the data processing apparatus 100 through wired internet, wireless internet, or other wired or wireless types of connections. A wireless internet technology may be implemented using a Wireless LAN (WLAN) such as Wi-Fi, Wireless Broadband (Wibro), World Interoperability for Microwave Access (Wimax), High Speed Downlink Packet Access (HSDPA), etc.

The PDA 12 may be connected to the data processing apparatus 100 through a wired/wireless scheme. For example, the PDA 12 may transmit data to the data processing apparatus 100 through an interface unit such as a wired/wireless data port, a memory card port, a video Input/Output (I/O) port, or the like.

As another example, the PDA 12 may transmit data to the data processing apparatus 100 by use of Bluetooth, Radio Frequency Identification (RFID), Infrared Data Association (IrDA), Ultra Wideband (UWB), ZigBee, etc.

The data input system may further include, as additional examples, a mobile phone, a smart phone, a laptop computer that is equipped with a storage medium, and/or the like, in addition to the image acquisition unit 10, the external server 11, and the PDA 12.

The display unit 20 may display data that is input from the data processing apparatus 100. For example, in the case in which image data is input from the data processing apparatus 100, the display unit 20 may display the image data.

The display unit 20 may include, for example, a Liquid Crystal Display (LCD), a Thin Film Transistor Liquid Crystal Display (TFT-LCD), an Organic Light-Emitting Diode (OLED), a flexible display, a 3-D display, and/or the like.

The navigation unit 21 may guide a robot, a driver, etc., to a destination based on data that may be input from the data processing apparatus 100.

The object recognition unit 22 may recognize the type, size, position, etc., of an object based on image data that may be input from the data processing apparatus 100.

The facial recognition unit 23 may recognize a facial component from image data that may be input from the data processing apparatus 100. The facial recognition unit 23 may distinguish each person by comparing recognized facial data with stored facial data.

The external server 24 may be connected to the data processing apparatus 100 through a wired internet, a wireless internet, or other wired or wireless types of connections. The external server 24 may perform various operations by use of data that is input from the data processing apparatus 100.

Each of the display unit 20, the navigation unit 21, the object recognition unit 22, the facial recognition unit 23, and the external server 24 may operate based on a different application. Each application may use a different type of data. The data type may be classified by the data size and data format.

The data processing apparatus 100 may include a memory unit 121, a conversion unit 122, a memory control unit 123, a signal control unit 124, and a setting unit 125.

The memory unit 121 may store data type information regarding the type of data and setting information used to operate the data processing apparatus 100.

The data type information may include at least one piece of information regarding a limitation of data size and storage format of data. The data type information represents information about the type of data which is capable of being processed in an application, and may be directly input by a manufacturer, a user, another device, etc. Alternatively, when an application is installed on the data processing apparatus 100, the data type information may be provided from the application. In a case in which an external device including an application is connected to the data processing apparatus 100, the data type information may be provided by the external device.

The setting information represents information indicating whether the input data is to be converted, information indicating whether the memory unit is to be divided into a shared area and a non-shared area, information indicating whether the memory unit is to be divided according to data type, information indicating whether the memory unit is divided according to the type of applications, information indicating how to set components constituting the data processing apparatus 100, and/or the like.

In addition, the memory 121 may store original data and/or converted data. The original data and/or the converted data may be stored in a buffer, and the data type information and setting information may be stored in the memory including types of a flash memory, a hard disk, and/or the like.

The memory unit 121 may include at least one type of a flash memory, a hard disk, a MultiMedia Card Micro (MMCMI), for example, secure digital (SD) memory or extreme digital (XD) memory, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic Random Access Memory, a magnetic disk, an optical disk, and/or the like. Alternatively, the memory unit 121 may be implemented as a buffer, and the buffer may include at least one type of a double buffer and a ring buffer.

The conversion unit 122 may convert data that is input from a data input device such as the image acquisition unit 10, based on the data type information stored in the memory unit 121.

As an example, in a case in which data created by the data input device has a format such as Joint Photographic coding Expert Group (JPEG), if a data format capable of being processed in a first application is a Graphics Interchange Format (GIF), a data format capable of being processed in a second application is Bitmap (BMP), and a data format capable of being processed in a third application is a Portable Network Graphics (PNG), the conversion unit 122 may convert the JPEG type of data into GIF, BMP, and/or PNG types of data.

As another example, in a case in which data created by the data input device has a data size of 100 bytes, if the maximum data size capable of being processed in the application is 10 bytes, the conversion unit 122 may convert the data having a size of 100 bytes into 10 bytes of data.

As another example, when data created by the data input device may have a format of JPEG and has a data size of 100 bytes, the type of data capable of being processed in the application may be GIF and the limitation of the data size of the application may be 90 bytes or below. In this case, the conversion unit 122 may convert the data of the JPEG type having a size of 100 bytes into a data of the GIF type having a size of 90 bytes or below. As described above, the conversion unit 122 may convert data based on at least two pieces of data type information.

The memory control unit 123 may store the converted data in the memory unit 121 or read the stored data. The memory control unit 123 may use a lock scheme to prevent new data from being stored in the memory unit 121 while the data stored in the memory unit 121 is being read therefrom. For example, the lock scheme may be a semaphore, a mutex (MUTual Exclusion), or the like.

In response to a data transmission signal being received from an application, the memory control unit 123 may read data capable of being processed in the application, among data stored in the memory unit 121. In response to the data being read, the memory control unit 123 may transmit the read data to the application. The data transmission signal may represent a signal that requests the data processing apparatus 100 to transmit data to the application. The application may be accommodated in, for example, the display unit 20, the navigation unit 21, and/or the object recognition unit 22.

In response to the storing of the converted data in the memory unit 121 being completed, the signal control unit 124 may generate a storage completion signal and may send the storage completion signal to the application. The storage completion signal may indicate that all converted data has been stored in the memory unit 121.

The setting unit 125 may set the data processing apparatus 100 based on the setting information that is stored in the memory unit 121.

As an example, the setting unit 125 may initialize the data processing apparatus 100 based on information regarding whether to convert input data, information regarding whether to divide input data, and information used to initialize the data processing apparatus 100.

As another example, the setting unit 125 may set the conversion unit 122 such that the conversion unit does or does not convert the data, based on the information regarding whether to convert input data.

As another example, the setting unit 125 may divide the memory unit 121 into a shared area and a non-shared area, based on the information regarding whether to divide the memory unit 121 into a shared area and a non-shared area.

As another example, the setting unit 125 may divide the memory unit 121 according to data type, based on the information regarding whether to divide the memory unit 121 according to data type. That is, the memory unit 121 may be divided according to data size and data format.

As another example, the setting unit 125 may divide the memory unit 121 according to application type, based on information regarding whether to divide the memory unit 121 according to application type.

In this case, the memory control unit 123 may store data to correspond to the divided area.

As described above, the data processing apparatus 100 may convert input data into various types of data that can be processed in respective applications and may provide the converted data to the applications. Accordingly, the respective applications receive a suitable form of input data.

After the converting of input data and the storing of the converted data are completed, the data processing apparatus 100 may notify the application of the completion of the storage. As the application recognizes that the storing of data has been completed, the application may receive and use the data in real time.

Figure 2:
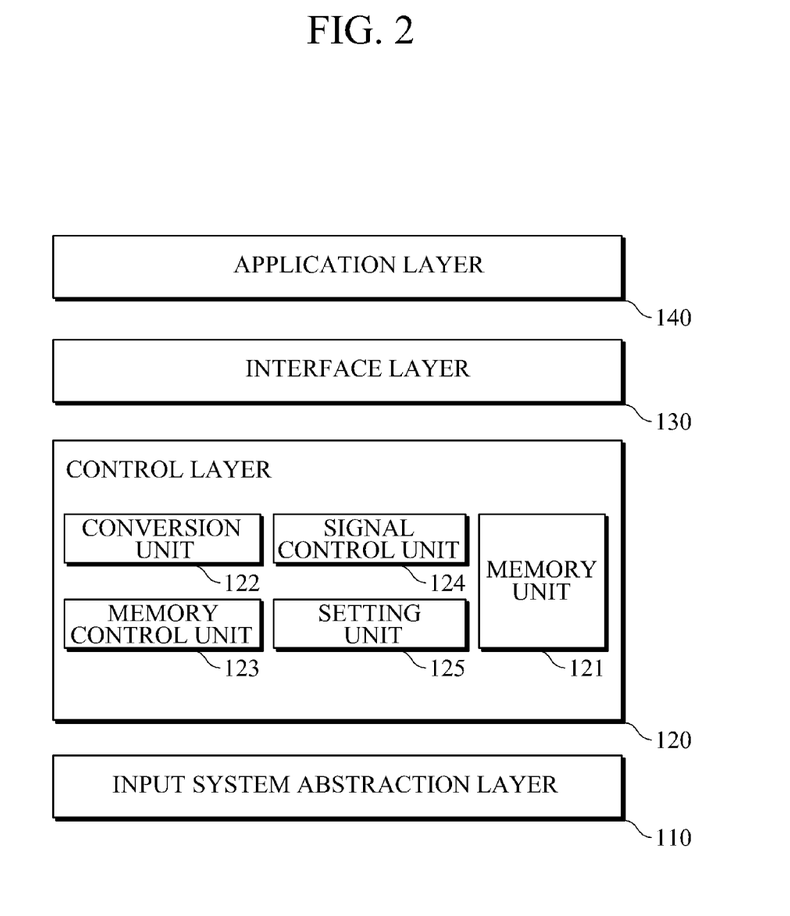
FIG. 2 is a block diagram illustrating an example of a software architecture of a data processing apparatus.

FIG. 2 is a block diagram illustrating an example of a software architecture of a data processing apparatus.

The software architecture of a data processing apparatus illustrated in FIG. 2 may include an input system abstraction layer (ISAL) 110, a control layer 120, an interface layer 130, and an application layer 140.

The input system abstraction layer 110 may be disposed between an input system such as the image acquisition unit 10 and the control layer 120 to provide an interface for the control layer 120. In the case in which a new type of input system is connected, the input system abstraction layer 110 may unify control signals, such as instructions, thereby facilitating the transmission/reception of data between the input system and the control layer 120.

For example, the input system abstraction layer 110 may match a control code used in the control layer 120 with a control code of the input system. For example, if the control layer 120 may use a control code written in java language and the input system may use a control code written in c-language, the input system abstraction layer 110 may match the control code written in java language with the control code written in c-language by use of Java Native Interface (JNI). That is, even if the control layer 120 and the input system use different programming languages, the input system abstraction layer 110 may facilitate a transmission/reception of data between the input system and the control layer 120.

The control layer 120 may serve to control overall operation of the data processing apparatus 100. The control layer 120 may include the memory unit 121, the conversion unit 122, the memory control unit 123, the signal control unit 124, and the setting unit 125 that may be identical to those described with reference to FIG. 1, and therefore repeated description of the same elements will be omitted. The control layer 120 may convert and store data that is received through the input system abstraction layer 110. In response to the storing of converted data being completed, the control layer 120 may transmit a storage completion signal to the application which may be included in the application layer 140 through the interface layer 130. If a data transmission signal is input from the application, the control layer 120 may read data which is capable of being processed in the application and may transmit the data to the application through the interface layer 130.

The interface layer 130 may serve to connect the control layer 120 to the application layer 140 such that the transmission/reception of data is achieved between the control layer 120 and the application layer 140. The interface layer 130 may be commonly used among various data apparatuses.

The application layer 140 may include various kinds of applications. For example, the display unit and the object recognition unit may have their own respective applications.

Figure 3:
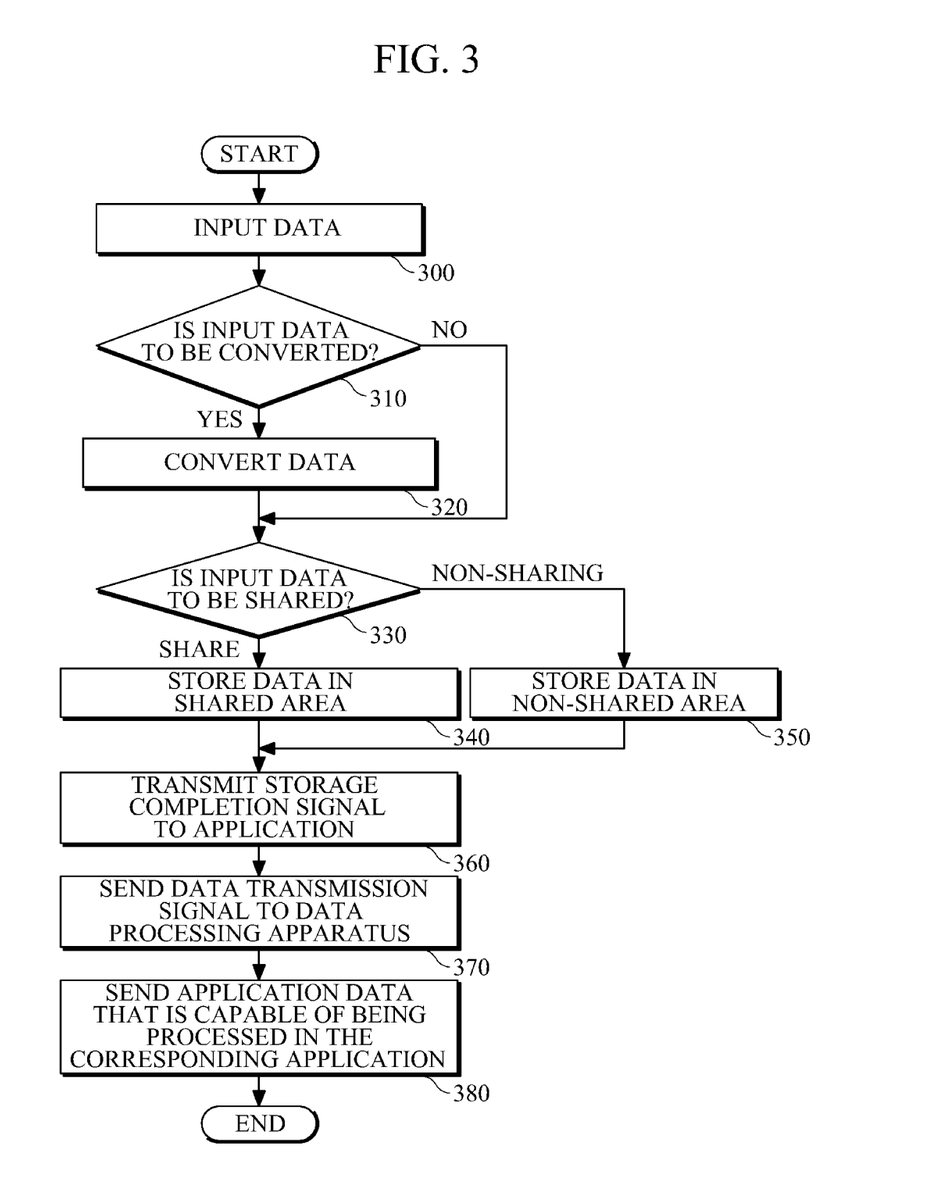
FIG. 3 is a flowchart illustrating an example of a data processing method.

FIG. 3 is a flowchart illustrating an example of a data processing method.

As illustrated in FIG. 3, and in conjunction with FIG. 1, the data input system such as, for example, the image acquisition unit 10 may input data into the data processing apparatus 100 (operation 300). The setting unit 125 may determine whether to convert the data based on the setting information that is stored in the memory unit 121 (operation 310). If the setting unit 125 determines that the data is to be converted, the conversion unit 122 may convert the input data based on the data type information (operation 320). If the setting unit 125 determines that the data is not to be converted, the conversion unit 122 does not perform conversion on the input data. The setting information may include information regarding whether the memory unit 121 is divided into a shared area and a non-shared area. The setting unit 125 may divide the memory unit 121 into a shared area and a non-shared area based on the setting information. The memory control unit 123 may determine whether the input data is to be shared or not (operation 330). If it is determined that the input data is to be shared, the memory control unit 123 may store the input data in the shared area (operation 340).

Meanwhile, if it is determined that the input data is not to be shared, the memory control unit 123 may store the input data in the non-shared area (operation 350). If the storing of data in the memory unit 121 is completed, the signal control unit 124 may generate a storage completion signal and may transmit the generated storage completion signal to the application (operation 360). In response to the input of the storage completion signal, the application may determine whether to receive the data stored in the memory unit 121. If the application determines to receive the data, the application may transmit a data transmission signal to the data processing apparatus 100 (operation 370). In response to receiving the data transmission signal, the data processing apparatus 100 may read a predetermined type of data capable of being processed in the application and may transmit the data to the application (operation 380).

If the data processing apparatus 100 is implemented as a robot, the data processing apparatus 100 may receive external image data from the image acquisition unit 10. The data processing apparatus 100 may convert the image data into various forms of data to be suitable for being processed in respective applications included in each of the navigation unit 21, the object recognition unit 22, and the facial recognition unit 23. The data processing apparatus 100 may transmit the converted image data into the respective applications.

As described above, the data processing apparatus 100 may convert the input data into a various forms of data to be suitable for being processed in various applications and may store the converted data. The data processing apparatus 100 may send the data converted to be suitable for each application to the corresponding application according to a data transmission signal In this manner, the applications may receive data from the data processing apparatus 100 in real time without the need for additional data conversion.

Figure 4:
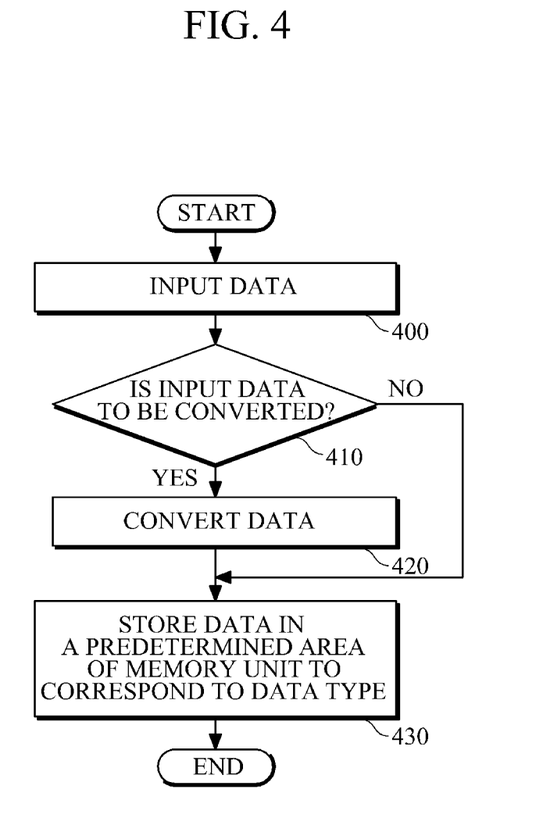
FIG. 4 is a flowchart illustrating another example of the storage of data illustrated in FIG. 3.

FIG. 4 is a flowchart illustrating another example of the storage of data illustrated in FIG. 3.

As illustrated in FIG. 4, and in conjunction with FIG. 1, the data input system such as, for example, the image acquisition unit 10 may input data into the data processing apparatus 100 (operation 400). The setting unit 125 may determine whether to convert the data based on the setting information that is stored in the memory unit 121 (operation 410). If the setting unit 125 determines that the data is to be converted, the conversion unit 122 may convert the input data based on the data type information (operation 420). If the setting unit 125 determines that the data is not to be converted, the conversion unit 122 does not convert the input data. The setting information may include information regarding whether the memory unit 121 is divided according to data type. The setting unit 125 may divide the memory unit 121 to correspond to data type based on the setting information. As a result, the memory control unit 123 may identify the type of original data or converted data, and may store the identified data in a predetermined area of the memory unit 121 according to the type of data (operation 430). If the original data or converted data is JPEG type, the memory control unit 123 may store the original or converted data in a predetermined area of the memory unit 121 designated for data of the JPEG type. Subsequent processes which may be performed until the required data is transmitted to the application may be identical to those described with reference to FIG. 3, and repetition of details thereof will be omitted.

As another example, the setting information may include information regarding whether the memory unit 121 is divided according to application type. The setting unit 125 may divide the memory unit 121 according to each application type based on the setting information. As a result, the memory control unit 123 may identify the type of data, and may extract an application capable of processing the identified type of data. The memory control unit 123 may store original data or converted data in a predetermined area of the memory unit 123 corresponding to the type of the extracted application.

As described above, the data processing apparatus 100 may store data in different areas of the memory unit 121 that are divided according to the type of data or the type of application, thereby facilitating access to data when an application receives the corresponding data.

Figure 5:
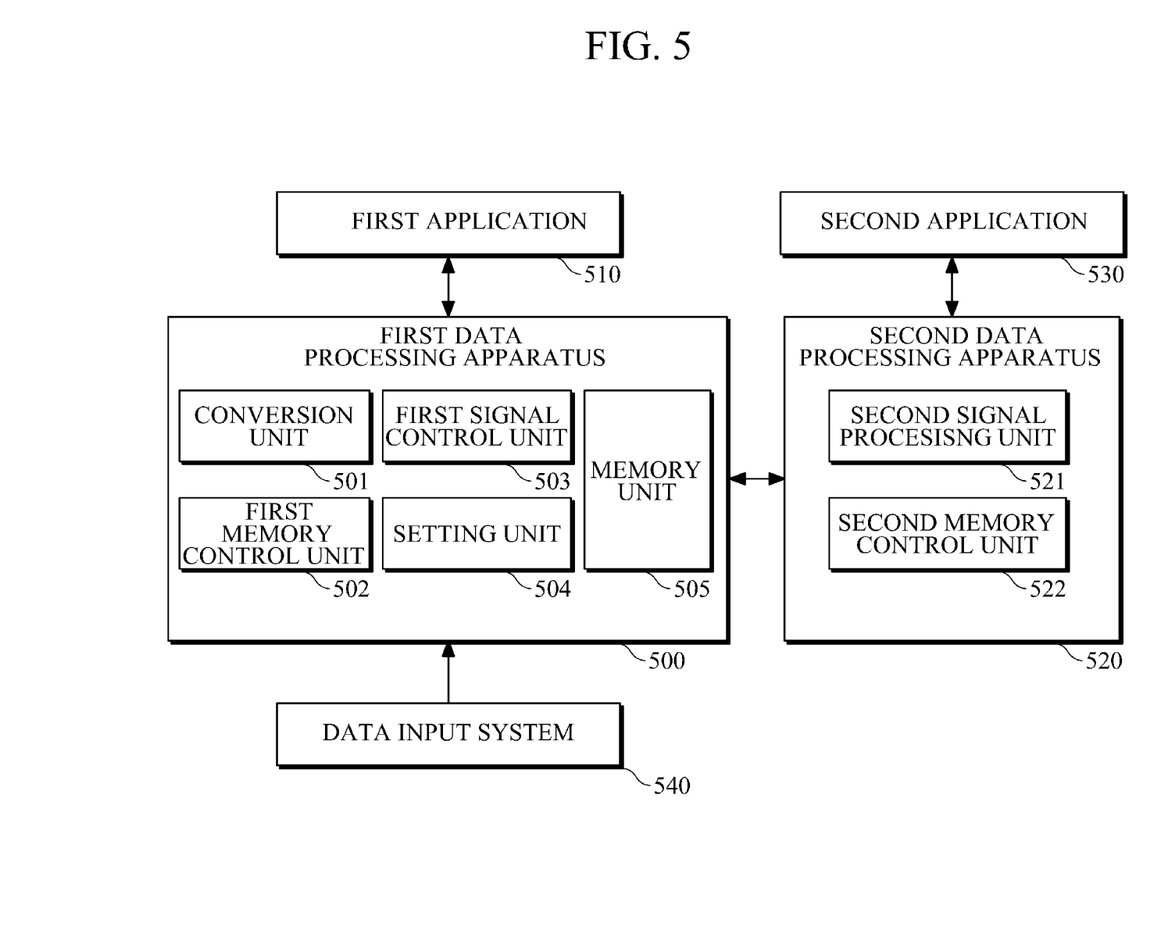
FIG. 5 is a block diagram illustrating an example of a data processing system.

FIG. 5 is a block diagram illustrating an example of a data processing system.

As illustrated in FIG. 5, a data processing system may include a first data processing apparatus 500, a first application 510, a second data processing apparatus 520, and a second application 530. Each of the first data processing apparatus 500 and the second data processing apparatus 520 may be connected to a plurality of applications. The first data processing apparatus 500 and the second data processing apparatus 520 may transmit or receive data and a control signal through various communication schemes.

The first data processing apparatus 500 may include a conversion unit 501, a first memory control unit 502, a first signal control unit 503, a setting unit 504, and a memory unit 505.

The conversion unit 501 may convert data, which may be input from a data input system 540, and the first memory control unit 502 may store the converted data in the memory unit 505. In response to the storing of the data being completed, the first signal control unit 503 may transmit a storage completion signal to the first application 510 and the second data processing apparatus 520.

Upon the reception of a data transmission signal from the first application 510, the first memory control unit 502 may read a predetermined type of data suitable for being processed in the first application 510, among data stored in the memory unit 505, and may send the data to the first application 510. The setting unit 504 may set the first data processing apparatus 500 based on the setting information stored in the memory unit 505.

The second data processing apparatus 520 may include a second signal processing unit 521 and a second memory control unit 522.

Upon reception of the storage completion signal, the second signal processing unit 521 may transmit a storage completion signal to the second application 530. Upon reception of a data transmission signal from the second application 530, the second memory control unit 522 may read a predetermined type of data suitable for being processed in the second application 530 and may send the data to the second application 530.

As another example, the second data processing apparatus 520 may further include a conversion unit and a memory unit. The second data processing apparatus 520 may read data from the memory unit, and the read data may be converted in the conversion unit. The second memory control unit 522 may store the converted data in the memory unit of the second data processing apparatus 520. In this manner, the second data processing apparatus 520 may store a new type of data, which is capable of being processed in the second application 530, in the memory unit and may send the new type of data to the second application 530.

According to the data processing system, two or more data processing apparatuses may commonly use a single memory unit.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus to process data, the apparatus comprising:
a memory configured to store data type information about data which is capable of being processed in an application;
a converter configured to convert input data based on the data type information;
a memory controller configured to perform control operations such that the converted data is stored in the memory;
a signal controller configured to generate a storage completion signal in response to the storing of the converted data in the memory being completed, and send the storage completion signal to the application; and
a setter configured to set the data processing apparatus based on setting information about the data processing apparatus that is stored in the memory,
wherein the setting information comprises information indicating whether the memory is to be divided according to data type and information indicating whether the memory is to be divided into a shared area and a non-shared area, and
the setter divides the memory into respective areas of data type based on the information indicating whether the memory is to be divided according to data type and divides the memory into a shared area and a non-shared area based on the information indicating whether the memory is to be divided into a shared area and a non-shared area.

2. The apparatus of claim 1, wherein:
the setting information further comprises information indicating whether the input data is to be converted, and
the setter determines whether to convert the input data based on the information indicating whether the input data is to be converted.

3. The apparatus of claim 1, wherein the data type information includes at least one piece of information regarding limitation of data size and storage format of data.

4. The apparatus of claim 1, wherein:
the converter converts the input data into first and second converted data,
the memory controller stores the first and second converted data in the memory, and
the first and second data have different data formats and each is suitable for processing by a user application that presents information represented by the respective first and second data to the user.

5. The apparatus of claim 1, wherein the converter converts the input data to a file size not exceeding a file size identified by the data type information.

6. The apparatus of claim 1, wherein the data format of each of the input data and converted data is that of a Joint Photographic coding Expert Group (JPEG), Graphics Interchange Format (GIF), Bitmap (BMP), or Portable Network Graphics (PNG).

7. The apparatus of claim 1, wherein the converter converts the input data to a different file format when the data type information indicates that the size of the input data exceeds the size of data that may be processed by the application.

8. The apparatus of claim 1, wherein the application receives the storage completion signal, retrieves the converted data from memory, and displays imagery of the retrieved data.

9. A method of processing data, the method comprising:
converting input data based on data type information about data which is capable of being processed in an application;
storing the converted data in a memory unit; and
generating a storage completion signal in response to the storing of the data in the memory unit being completed, and sending the storage completion signal to the application,
wherein the storing of the converted data comprises
storing the converted data in respective areas of the memory unit that are divided for each data type, depending on the data type; and
storing the converted data into a shared area or a non-shared area of the memory unit, which are divided, depending on whether the input data is to be shared.

10. The method of claim 9, further comprising determining whether to convert the input data.

11. The method of claim 9, wherein the data type information includes at least one piece of information regarding limitation of data size and storage format of data.

12. The method of claim 9, wherein:
the input data is converted into first and second converted data,
the first and second converted data is stored in the memory unit, and
the first and second data have different data formats and each is suitable for processing by a user application that presents information represented by the respective first and second data to the user.

13. The method of claim 9, wherein the input data is converted to a file size not exceeding a file size identified by the data type information.

14. The method of claim 9, wherein the data format of each of the input data and converted data is that of a Joint Photographic coding Expert Group (JPEG), Graphics Interchange Format (GIF), Bitmap (BMP), or Portable Network Graphics (PNG).

15. The method of claim 9, wherein the input data is converted to a different file format when the data type information indicates that the size of the input data exceeds the size of data that may be processed by the application.

16. The method of claim 9, further comprising:
receiving, by the application, the storage completion signal;
retrieving, with the application, the converted data from memory; and
displaying, with the application, imagery represented by the retrieved data on a display.

* * * * *